June 16, 1953     L. R. SIMMONS     2,642,293
GUIDE SHEAVE ARRANGEMENT FOR CONTROL CABLE EXTENDING
BETWEEN TRACTOR AND TRAILER VEHICLES CONNECTED
BY A WEIGHT-TRANSFERRING HITCH
Filed Nov. 1, 1948     2 Sheets-Sheet 1
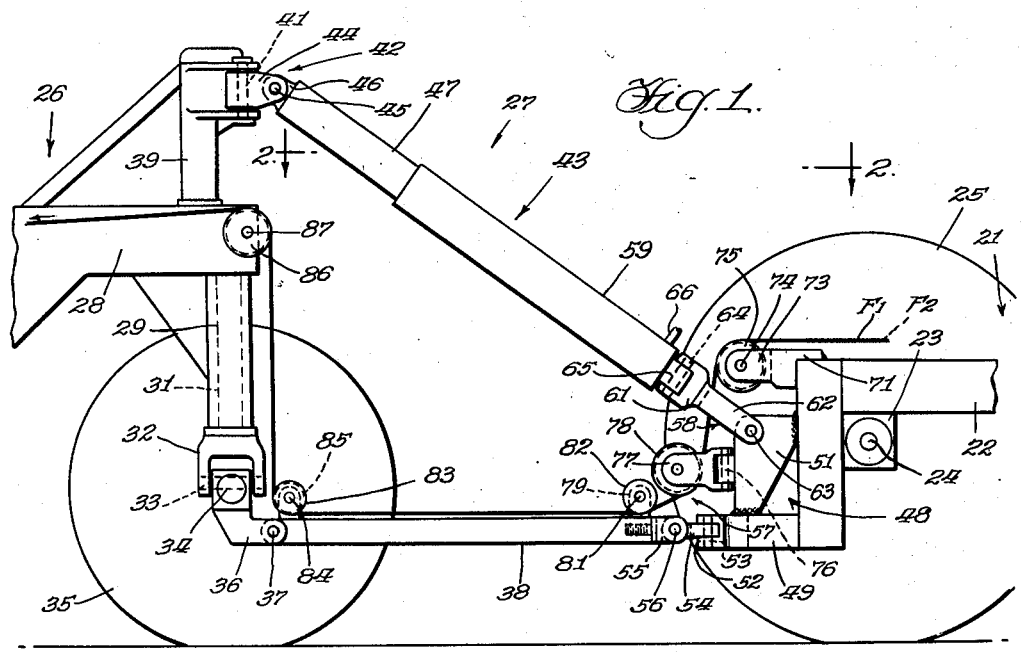
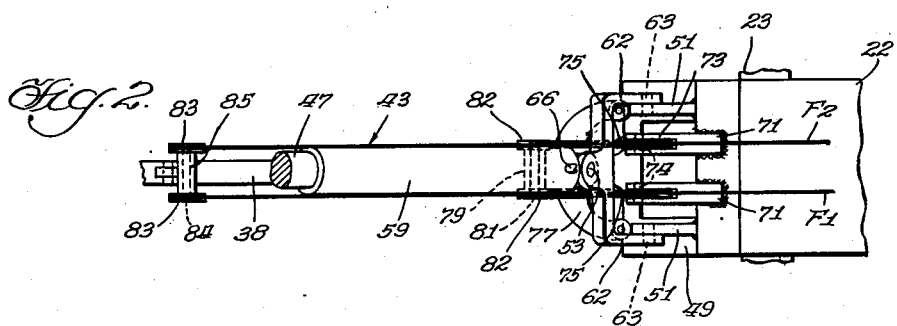
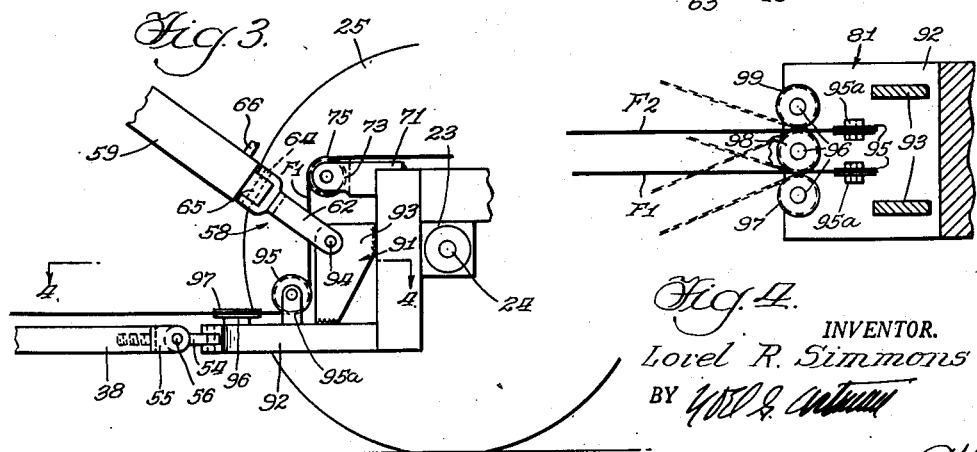
INVENTOR.
Lovel R. Simmons June 16, 1953 — L. R. SIMMONS — 2,642,293
GUIDE SHEAVE ARRANGEMENT FOR CONTROL CABLE EXTENDING BETWEEN TRACTOR AND TRAILER VEHICLES CONNECTED BY A WEIGHT-TRANSFERRING HITCH
Filed Nov. 1, 1948 — 2 Sheets-Sheet 2
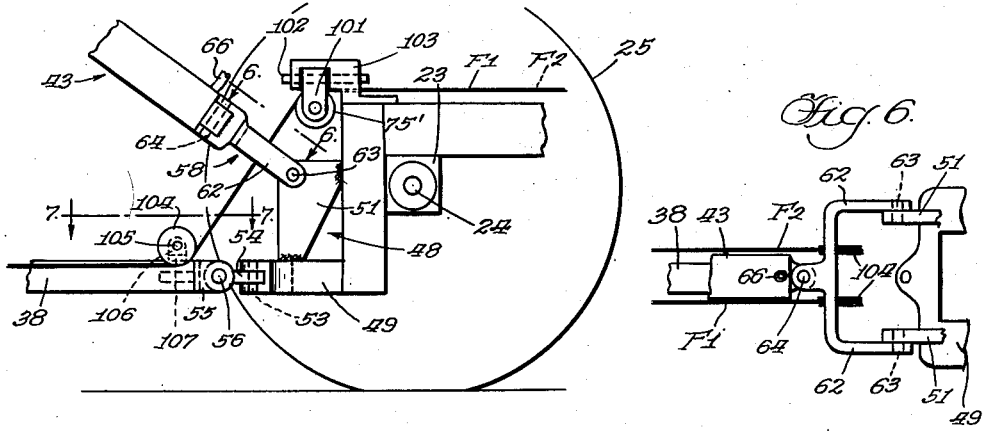
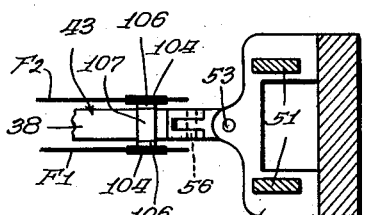
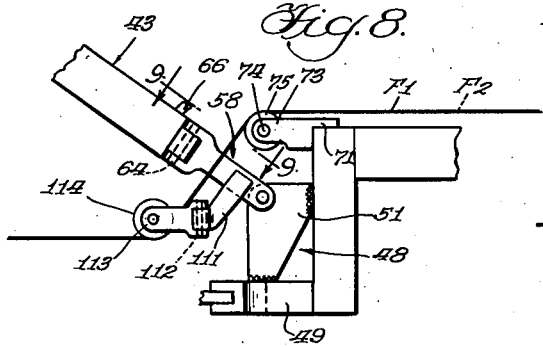
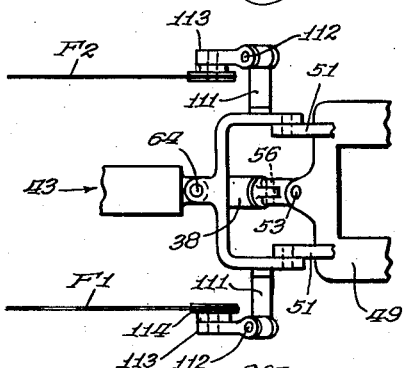
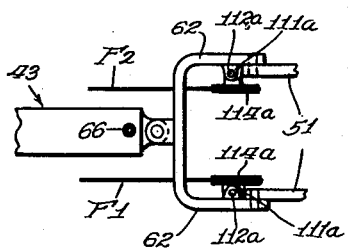
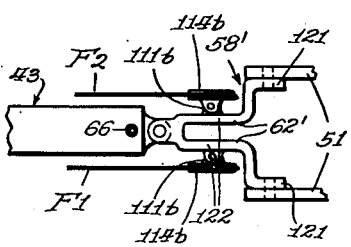
INVENTOR.
Lovel R. Simmons Patented June 16, 1953

2,642,293

UNITED STATES PATENT OFFICE 2,642,293

GUIDE SHEAVE ARRANGEMENT FOR CONTROL CABLE EXTENDING BETWEEN TRACTOR AND TRAILER VEHICLES CONNECTED BY A WEIGHT-TRANSFERRING HITCH

Lovel Reynolds Simmons, Jackson, Miss.

Application November 1, 1948, Serial No. 57,676

3 Claims. (Cl. 280—33.2)

This invention has to do with control cable guide means and relates particularly to an arrangement of control cable guide means adapted for guiding a control cable extending between tractor and trailer vehicles which are articulately connected by a weight transferring hitch structure.

The invention has a particular utility in connection with a tractor and a trailer of a character having parts such as the blade and relatively movable earth carrying parts of a trail-behind scraper and earth mover when these two vehicles are interconnected by a weight transferring hitch structure which is articulately connected between the vehicles to facilitate relative movement thereof over an irregular ground surface and about curves and sharp turns. Such hitch structure contains relatively movable parts forcibly manipulatable to transfer weight from the trailer vehicle onto the tractor.

One of the objects of this invention is to provide a practical arrangement of guide sheaves for a control cable extending between a winch on the tractor and the parts on the trailer which are to be manipulated by the control cable, and capable of so guiding the control cable that the force components imparted by the cable to the various sheaves will not materially oppose manipulation of the parts of the hitch structure during transfer of the weight from the trailer, nor during traversal of an irregular ground course by the vehicles.

A further object is the provision of a control cable guide sheave arrangement such that force components exerted by the control cable upon the various sheaves shall be neither significantly opposed nor complemented by articulate maneuver of the hitch structure, for to do so might either strain the cable beyond its elastic limit or modify the position of parts on the trailer which are to be maintained in adjusted position by the cable. Also, it would be undesirable for the force components imposed by the cable upon the cable guide sheaves to oppose movement of the hitch structure elements when they are manipulated for transferring weight onto the tractor since the energy for this manipulation of the hitch structure parts is obtained from the tractor power plant, and any energy diverted from the power plant for overcoming force components of the control cable tending to trammel weight transferring movement of the hitch structure parts would correspondingly diminish the amount of power obtainable from the engine for causing locomotion of the vehicle train. This is important because usually when weight is being transferred from the trailing vehicle onto the tractor for increasing the traction of the tractor vehicle, adverse road conditions are present requiring close to maximum energy from the tractor power plant. Under these circumstances any diminution of available power for advancing the vehicles may be critical with respect to whether the vehicles can advance or continue in a state of movement.

These and other desirable objects inherent in and encompassed by the invention will be more fully comprehended by referring to the ensuing description, the appended claims and the annexed drawings wherein:

Fig. 1 is a side elevational view showing the rear portion of a tractor, the front end portion of a trailer in the form of an earth carrying scraper having an inflated tire wheel type of running gear, a weight transferring hitch structure interconnecting the tractor and trailer, and a control cable guide sheave arrangement embodying a preferred form of the invention.

Fig. 2 is a fragmentary plan view taken on line 2—2 of Fig. 1.

Fig. 3 is a side elevational view of a modified control cable guide sheave arrangement installed on the rear portion of a tractor.

Fig. 4 is a plan view taken on the line 4—4 of Fig. 3.

Fig. 5 is a view taken similarly to Fig. 3 of a third embodiment of the invention.

Fig. 6 is a fragmentary view taken on the line 6—6 of Fig. 5, illustrating the yoke for connecting one end of a hydraulic ram unit of the hitch structure with a bracket on the rear of the tractor.

Fig. 7 is a fragmentary plan view taken on the line 7—7 of Fig. 5.

Fig. 8 is a view taken similarly to Fig. 5, but illustrating sheaves mounted on respective legs of the yoke which connects the hydraulic ram with a bracket on the rear of the tractor.

Fig. 9 is a view taken generally horizontally on the line 9—9 of Fig. 8.

Fig. 10 is a view taken similarly to Fig. 9, but showing a different embodiment wherein the cable guide sheaves are disposed for carrying the cables within the space embraced by the yoke legs in contrast to exteriorly of the legs.

Fig. 11 is a view taken similarly to Figs. 9 and 10 but showing a modified form of yoke having the sheaves mounted on the opposite outer sides of the legs of this yoke.

With continued reference to the drawings, and particularly to Figs. 1 and 2, there is shown the rear portion of a wheel type tractor 21 having a body 22 projecting forwardly from a differential housing 23 from which axles 24 extend oppositely for driving traction wheel 25 of the rubber tire variety. The rear end of the tractor is coupled to a trailer vehicle 26 for towing the same by means of a weight-transferring hitch structure 27.

The trailer, of which only a forward portion is shown, is an earth hauling scraper unit of which the frame has a forwardly projecting portion 28 having a downwardly extending bearing 29 in which there is journalled a kingpin 31 having a yoke 32 upon its lower end. The furcations of the yoke 32 carry a pin 33 upon which a front axle 34 is rockably mounted, this axle having inflated tire wheels 35 upon opposite end portions. A forward bifurcated extension 36 on the axle 34 carries a horizontal cross pin 37 for pivotal connection with a drawbar 38. A pedestal 39 projecting upwardly from the frame extension 28 carries a vertical pin 41. Vertical pin 41 comprises part of a universally articulate joint or connection 42 for attaching the upper end of a hydraulic ram 43 with the pedestal 39. Said joint 42 comprises a yoke 44 pivoted on the pin 41 and carrying a cross pin 45 upon which an apertured ear 46 at the upper end of a plunger 47 of the ram 43 is pivotally mounted.

A bracket structure 48 on the back end of the tractor comprises a U-shaped member 49 having its legs secured to the back portion of the tractor, and a pair of laterally spaced brace members 51. Vertically spaced furcations 52 on the bracket element 49 contain a vertical pivot pin 53 for the front end of a link 54 which has its rear end extending between furcations 55 on the front end of the drawbar and pivotally connected therewith by a horizontal pivot pin 56. These parts 52—53—54—55 and 56 constitute a universally articulate connection 57 between the bracket 48 (and consequently the tractor) and the drawbar 38. A universally articulate connection 58 is formed between the lower end of the ram cylinder 59 and the bracket elements 51 by a yoke 61 having its laterally spaced legs 62 respectively pivotally connected with the elements 51 by horizontal pivot pins 63, and an upwardly inclined pivot pin 64 which pivotally connects the bifurcated rear end of the yoke 61 with an apertured ear 65 on the lower end of the ram cylinder.

The hitch structure 27 is a triangular formation of which a lower horizontal side is formed by the drawbar 38, of which a vertical rear side is formed by the front portion of the trailer (such portion including the bearing sleeve 29, the yoke spindle 31 journaled in such a bearing sleeve and the pedestal 39), and of which hitch structure the third side is formed by the forwardly and downwardly extending hydraulic ram 43. Each of the three rigid sides of the triangular hitch structure is universally articulately connected at its ends (coincident with the corners or apexes of the triangular hitch structure) with ends of each of the other two sides. The articulate connection between the adjacent forward end of the drawbar 38 and the lower forward end of the hydraulic ram 43 is formed by the universally articulate joints 57 and 58, whereas the universally articulate connection between the rear vertical side of the triangular hitch structure and the upper end of the hydraulic ram is constituted by the joint 42, and the universally articulated connection between the back end of the drawbar 38 and the lower end of the vertical side of the hitch structure includes the pivot pins 33 and 37 which are arranged transversely to one another. When the hitch structure 27 is relaxed as it is when there is no fluid under pressure in the ram cylinder 59 below the lower end of the plunger 47, the plunger can work telescopically with the cylinder 59 to facilitate up and down displacement of the front corner of the triangular structure pursuant to the vehicles changing their relative elevation as they proceed over a ground course of irregular elevation. The universally articulate joints at the three corners of the hitch structure facilitate the tractor changing its course relatively to the trailer pursuant to the turning of a corner and allow the drawbar and the ram 43 to swing about substantially coincident vertical axes of the pivot pin 41 and of the bearing 29.

When it is desired to increase the traction of the tractor wheels 25 with the ground, fluid under pressure is introduced through a conduit 66 into the lower end of the ram cylinder 59, thereby distending the hydraulic ram 43 and forcing the forward corner of the hitch structure downwardly and causing weight to be transferred from the forward end of the trailer onto the rear end of the tractor. This function of the weight transferring hitch structure is used only under emergency conditions, as during off the highway operation when the traction wheels of the tractor may encounter a slippery ground surface upon which these wheels would spin unless their frictional association with such ground surface were increased by the weight transfer. A weight transferring hitch structure of this general character is fully described and is claimed in my United States Patent No. 2,382,449.

The present invention concerns the arrangement of guide sheaves for a control cable which has two flights F1 and F2 which lead to separate winches (not shown) on the tractor. When the winch drums are caused to rotate in one direction by driving force received from the tractor engine, the flights F1 and F2 will be advanced toward and onto the drums, and when the drums are rotated in the opposite direction the two cable flights will be reversed in their direction of movement. These cable flights extend rearwardly to parts to be operated thereby upon the scraper 26, and since such cable flights are maintained in a taut condition, it is necessary that they be guided upon sheaves so they will not interfere with swinging motion of the hitch structure relatively to either of the vehicles. It is also necessary that movement of either or both of the vehicles about their respective universally articulate connections with the hitch structure shall not increase or decrease the degree of tautness in either of the cable flights by any substantial amount, so the elastic limit in either of the cables shall not be exceeded nor the cables broken, and so the position of any part adjusted by the cables will not be modified. It is also important that neither of the cable flights will exert a force component upon any of the sheaves in a direction which would oppose downward displacement of the forward end of the hitch structure while it is being energized by the introduction of fluid into the lower end of the ram cylinder 59, since such force components would increase the amount of pressure necessary in the cylinder for causing the desired amount of weight transfer and would correspondingly increase the amount of engine power necessary for maintaining this pressure. These various requirements in the disposition of the control cable flights are accomplishable by mounting the guide sheaves for the control cable in the manner illustrated in Figs. 1 and 2.

Referring now to Figs. 1 and 2 there will be seen a pair of brackets 71 each incorporating a sheave housing 73 having an axle 74 for a sheave 75. The cables F1 and F2 are trained respectively over the sheaves 75. Bracket elements 51 carry a pair of upstanding pivot pins 76 upon which are pivoted housings 77 for sheaves 78. These sheaves 78 are spaced apart transversely of the tractor less distantly than the legs 62 of the yoke 61 wherefore the flights of the cables leading from the sheaves 75 to these sheaves 78 pass downwardly through the space embraced by said yoke legs.

A boss 79 on a forward portion of the drawbar 38 carries a bearing rod 81 having sheaves 82 journalled upon opposite of its end portions. Sheaves 82 are in respective alignment with the sheaves 78 and likewise with sheaves 83 which are journalled upon opposite end portions of a rod 84 secured to a rear end portion of the drawbar 38 by an apertured boss 85. A pair of guide pulleys or sheaves 86 are journalled upon horizontal pins 87 suitably anchored on the front end of the frame of the trailing vehicle.

The cable F1 leads from a winch (not shown) on the tractor successively over pulleys or sheaves 75, 78, 82, 83, and 86 at one side of the center line of the hitch structure 27, whereas the cable F2 is trained over the correspondingly numbered pulleys or sheaves at the opposite side of such center line. The cable F2 leads either from the same winch drum as the cable F1 or a separate drum. The back ends of the cables F1 and F2 extend to and are connected with different parts of the trailing vehicle to be forcibly operated when sufficient tensile force is exerted in the cables for causing endwise movement thereof.

Because of those flights of the cables F1 and F2 extending between the sheaves 78 and 82 being substantially horizontal, and because of those portions of the cables extending between the sheaves 82 and 83 being in parallelism with the drawbar 38, there will be no significant vertical force component exerted by these cable flights upon the sheaves 82 in opposite to any downward component force imposed by the weight transferring hitch structure 27 onto the tractor. Also it will be noted that since the sheaves 82 are swingable with the drawbar of the hitch structure and since the sheaves 78 are swingable about the vertical pins 76 on the tractor mounted bracket structure 48, the cable flights between the sheaves 78 and 82 can readily adjust themselves angularly to accommodate horizontal swinging of the drawbar relatively to the tractor. Since the sheaves 83 are substantially below the sheaves 86 and the cable flights extending between these upper and lower sheaves 86 and 83 are substantially parallel with the vertical pivot axis about which the hitch structure is horizontally swingable, such horizontal swinging of the hitch structure for guiding the trailing vehicle will not interfere with the cable staying upon the sheaves 83 and 86. Also since the sheave 83 is in close proximity with the rear horizontal pivot 37 of the drawbar and since the sheave 82 is in close proximity with the front horizontal pivot 56 of the drawbar, changes in elevation of the front end of the hitch structure 27 pursuant to changes in length of the hydraulic ram 43 will have no tendency to incur substantial movement of the cables circumferentially of the sheaves 82 or 83, nor to change the degree of tautness in these cables.

In the arrangement shown in Figs. 3 and 4 a bracket structure 91 on the rear of the tractor has a horizontal element 92 and laterally spaced brace elements 93. The legs 62 of the yoke 58 are pivotally attached respectively to the elements 93 at 94. A pair of laterally spaced sheaves 95, have their housing brackets 95A secured to the element 92, and these sheaves 95 are respectively below the sheaves 75 mounted thereabove and are for having the cables F-1 and F-2 trained respectively thereover.

A more rearward portion of the bracket 91 has three vertical sheave journalling pins 96 anchored therein, and three circumferentially grooved sheaves 97, 98 and 99 are respectively journalled on these pins. Diametrically opposite peripheral portions of the center sheave 98 are in close proximity to adjacent peripheral portions of the sheaves 97 and 99 to prevent lateral escape of the cables F-1 and F-2 from the position in which they are held as illustrated in Fig. 4 between the sheaves.

When the weight-transferring hitch structure 27 and its drawbar 38 are swung in one horizontal direction, the cables F-1 and F-2 will swing with the drawbar into one of the dotted line positions illustrated in Fig. 4 whereas when the drawbar is swung in the other horizontal direction relatively to the tractor, the cables F-1 and F-2 will be swung therewith in the other dotted line position shown in Fig. 4. The sheaves 95, 97, 98, and 99 cooperate with sheaves as those designated 83 adjacently to the rear end of the drawbar for positioning the lower flights of the cables F-1 and F-2 in close proximity to and in parallelism with the drawbar irrespective of the pivoted relation of the drawbar relatively to the tractor. In this way the guide sheaves for the control cables prevent the existence of any substantial vertical force components which would trammel or oppose manipulation of the weight-transferring hitch structure pursuant to vertical or horizontal swinging thereof, while the vehicle train proceeds in a non-linear path over an irregular ground surface. Neither will the cables be caused to creep any substantial amount circumferentially of any of the sheaves nor move lengthwise pursuant to such manipulations of the weight-transferring hitch wherefor no inordinate strains will be imposed upon the cables, nor will the parts operated thereby upon the trailing vehicle be caused to change their status of adjustment.

Figs. 5, 6, and 7 disclose a modification wherein sheaves 75' corresponding to the sheaves 75 and housings 101 pivoted upon pins 102 which are disposed horizontally in brackets 103 and mounted upon the upper rear end of the tractor in such a way that the sheaves 75' depend downwardly rearwardly and are swingable about the axes of their pins 102. The legs 62 of the yoke 58 embrace the cables F-1 and F-2 which extend over the sheaves 75' and downwardly and rearwardly beneath sheaves 104 which are mounted upon a pin 105 carried upon ears 106 of a bracket 107 on the front end of the drawbar 38.

When the hitch structure is swung horizontally, the ram 43 swings about the axis of the pin 64 while the drawbar swings about the pin 53. Because of the close proximity of the sheaves 104 to the pin 53, the lower part of the cable flights extending through the space embraced by the yoke legs 62 will not be displaced sufficiently far to be pressed against such yoke legs. The various flights of the cables extending between pulleys or sheaves correspond generally to the cable flight arrangement in the above described embodiments and obtain substantially the same advantages.

The embodiment shown in Figs. 8 and 9 comprises a yoke 58 having brackets 111 projecting downwardly and rearwardly respectively from the yoke legs 62. Each bracket 111 carries a vertical pivot pin 112 to which the housing 113 of a sheave 114 is pivotally connected. In Fig. 9 it can be seen that the brackets 111 are mounted on the outer sides of the yoke legs 62 whereby the sheaves 114 carry the cable F1 and F2 exteriorly of the space embraced by the bracket legs 62.

Fig. 10 is an arrangement similar to Figs. 8 and 9 excepting that the brackets 111a, corresponding to the brackets 111, are mounted on the inner opposed sides of the yoke legs 62 wherefore the cables F1 and F2 carried by the sheaves 114a are caused to pass between the yoke legs. The parts in Fig. 10 designated by reference numerals having the suffix "a" correspond to the same respective parts designated by corresponding reference numerals without the suffix in Figs. 8 and 9.

In Fig. 11, a yoke 58' corresponding to the yoke 58 has legs 62' with inwardly turned footing portions 121 of which the outer ends are pivotally connected with the tractor mounted bracket elements 51. Inwardly displaced portions 122 of the yoke legs 62' carry brackets 111b on their outer sides similarly to the manner in which the brackets 111 are carried upon the bracket legs 62 in Figs. 8 and 9. By offsetting the leg portions 122 inwardly, the sheaves 114b can be mounted on the outer side of the bracket legs while still maintaining the control cables F1 and F2 passing thereover in close proximity when it is desired that they should be so disposed.

In each of the embodiments disclosed in Fig. 11, Fig. 10 and in Figs. 8 and 9 the sheaves 114b, 114a, and 114 are swingable about vertical axis pins as 112, and the flights of the control cables extending rearwardly (to the left as viewed in Fig. 8) reach directly to a sheave as that illustrated at 83 in Fig. 1 without first passing over an intermediate sheave. The sheaves 114, 114a and 114b are mounted sufficiently closely to the pivotal connection of the yoke legs 62 to the tractor mounted bracket 48, that any vertical component of force exerted by the control cables upon said sheaves will not materially oppose manipulation of the vehicle hitch structure parts when transferring weight, nor will such manipulation of the hitch structure parts urge pivoting of the yoke about its connection with the bracket 48 sufficiently to displace the sheaves 114, 114a, or 114b enough to significantly vary the tension in the control cable.

I claim:

1. In a cable guide arrangement for a control cable extending rearwardly from a tractor to a trailer connected with the tractor by a weight-transferring hitch structure universally articulately connected with the tractor and comprising a yoke having widely spaced legs pivotally connected with the rear of the tractor extending downwardly and forwardly and having their footing portions pivotally connected with the tractor about a horizontal axis extending transversely of the tractor, a pair of sheave housings respectively connected with the legs of said yoke for swinging about generally upright axes spaced transversely from the sheave wheel axes which are disposed for rotation about substantially horizontal axes, and cable guide sheaves on the rear of the tractor at positions above said yoke and being so disposed with respect to the yoke that a control cable flight can extend from one of the last named sheaves in a straight line to and about one of the yoke mounted sheaves and that a second control cable flight can extend from the other of the last mentioned sheaves in a similar manner to the other of the yoke mounted sheaves.

2. The combination set forth in claim 1, wherein the yoke housings are disposed exteriorly of the yoke legs, whereby the said control cable flights extending from the second named sheaves pass exteriorly of the space embraced by the yoke legs.

3. The combination set forth in claim 1 wherein the yoke legs have outward oppositely turned footing portions, wherein the legs of the yoke are disposed on close proximity, and wherein the sheave housings are mounted on the exterior sides of said yoke legs to facilitate passage of said control cable flights exteriorly of the space between the yoke legs.

LOVEL REYNOLDS SIMMONS.

References Cited in the file of this patent

UNITED STATES PATENTS

| Number | Name | Date |
|---|---|---|
| 2,107,118 | Knapp | Feb. 1, 1938 |
| 2,377,315 | Beitzel | June 5, 1945 |
| 2,414,933 | Daniels | Jan. 28, 1947 |
| 2,459,098 | Simmons | Jan. 11, 1949 |
| 2,486,072 | Smith | Oct. 25, 1949 |

FOREIGN PATENTS

| Number | Country | Date |
|---|---|---|
| 541,887 | Germany | Jan. 18, 1933 |